(12) United States Patent
Lin

(10) Patent No.: US 6,209,585 B1
(45) Date of Patent: Apr. 3, 2001

(54) COVER WITH PIVOTABLE HANDLE FOR A VACUUM CONDUIT

(75) Inventor: Chung-Yang Lin, Hsin-chu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 09/593,872

(22) Filed: Jun. 14, 2000

(51) Int. Cl.$^7$ ..................................................... F16L 55/11
(52) U.S. Cl. ................................. 138/89; 138/94; 15/314; 220/212.5
(58) Field of Search .......................... 138/89, 89.1, 89.3, 138/92, 94; 15/310, 314, 331; 4/295; 220/212.5; 215/355, 228; 285/901

(56) References Cited

U.S. PATENT DOCUMENTS

| | | | |
|---|---|---|---|
| 849,618 | * | 4/1907 | Hurlburt .................................. 138/89 |
| 2,791,792 | * | 5/1957 | Shearer, Sr. .............................. 15/314 |
| 2,984,856 | * | 5/1961 | Hunt et al. .............................. 15/314 |
| 5,692,542 | * | 12/1997 | Smith ...................................... 138/89 |
| 5,749,561 | * | 5/1998 | Worthington ............................. 4/295 |

\* cited by examiner

*Primary Examiner*—James Hook
(74) *Attorney, Agent, or Firm*—Tung & Associates

(57) ABSTRACT

A cover assembly that is equipped with a pivotable handle for sealing a vacuum conduit opening is provided. The cover assembly is constructed generally by a cover body and a pivotable handle resting in a recess in a top surface of the cover body. The cover body is constructed by an upper annular portion and a lower annular portion integrally formed or joined together. The upper annular portion has an outside diameter that is larger than an outside diameter of the conduit opening, while the lower annular portion has an outside diameter that is smaller than an inside diameter of the conduit opening for sealing the conduit opening when the lower annular portion of the cover body is inserted into the conduit opening, a bottom surface of the upper annular portion sealingly engages the end surface of the conduit opening. The upper annular portion may further include a recess in a top surface for concealing the pivotable handle therein. The pivotable handle of generally elongated rectangular shape has an elongated slot opening formed therethrough in a longitudinal direction. A finger grip is provided at one end of the handle such that when the elongated slot opening slidingly engages a pin mounted in a horizontal position in the recess, the handle rests horizontally in the recess when not in use, and stands vertically in the recess when pulled up by a sliding engagement between the elongated slot opening and the horizontally mounted pin.

18 Claims, 3 Drawing Sheets

COVER WITH PIVOTABLE HANDLE FOR A VACUUM CONDUIT

FIELD OF THE INVENTION

The present invention generally relates to a cover for a conduit and more particularly, relates to a cover equipped with a pivotable handle for covering a conduit of a central vacuum system in a semiconductor fabrication facility.

BACKGROUND OF THE INVENTION

In the recent development of semiconductor fabrication technology, the continuous miniaturization in device fabricated demands more stringent requirements in the fabrication environment and contamination control. When the feature size was in the 2 μm range, a cleanliness class of 100–1000 (which means the number of particles at sizes larger than 0.5 μm per cubic foot) was sufficient. However, when the feature size is reduced to 0.25 μm, a cleanliness class of 0.1 is required. It has been recognized that an inert minienvironment may be the only solution to future fabrication technologies when the device size is reduced further. In order to eliminate micro-contamination and to reduce native oxide growth on silicon surfaces, the wafer processing and the loading/unloading procedures of a process tool must be enclosed in an extremely high cleanliness minienvironment that is constantly flush with ultrapure nitrogen that contains no oxygen and moisture.

Different approaches in modern clean room design have been pursued in recent years with the advent of the ULSI technology. One is the utilization of a tunnel concept in which a corridor separates the process area from the service area in order to achieve a higher level of air cleanliness. Under the concept, the majority of equipment maintenance functions are conducted in low-classified service areas, while the wafers are handled and processed in more costly high-classified process tunnels. For instance, in a process for 16M and 64M DRAM products, the requirement of contamination control in a process environment is so stringent that the control of the enclosure of the process environment for each process tool must be considered. This stringent requirement creates a new minienvironment concept which is shown in FIG. 1. Within the enclosure of the minienvironment of a process tool 10, an extremely high cleanliness class of 0.1 (which means the number of particles at sizes larger than 0.1 μm per cubic foot) is maintained, in contrast to a cleanliness class of 1000 for the overall production clean room area 12. In order to maintain the high cleanliness class inside the process tool 10, the loading and unloading sections 14 of the process tool must be handled automatically by an input/output device such as a SMIF (standard mechanical interfaces) apparatus. A cassette or wafer can be transported into the process tool 10 by SMIF pod 18 situated on top of the SMIF apparatus 20.

In a conventional SMIF apparatus 20 such as that shown in FIG. 1, the apparatus 20 consists of a robotic arm which is normally configured for gripping the top of a cassette 30 from a platform on which the cassette 30 is placed (inside a pod). The robotic arm, sometimes replaced by a gripper assembly, is capable of transporting the cassette 20 into the process tool and place it onto a platform 16 vertically such that the cassette 30 is oriented horizontally. At the beginning of the process, an operator positions a SMIF pod 18 on top of a platform/elevator 22 which contains a cassette 40 holding, for instance, 24 wafers in an upright position. The elevator then descends into the SMIF apparatus 20 for the robotic arm to transport cassette 30 into the process tool. The SMIF system 20 is therefore capable of automatically utilizing clean isolation technology to maintain a high class clean room effectiveness near wafers and processing equipment. The operation of the robotic arm or the gripper is controlled by an ancillary computer (not shown) or by the process tool 10. The cassette 30 carries wafers or other substrates that are being processed.

Also provided in the clean room is a central vacuum system (not shown) equipped with vacuum outlet 40 as shown in FIG. 1. The vacuum outlet 40 is constructed by a vacuum conduit 42 and a cover assembly 44. The central vacuum system is provided with vacuum outlet 40 throughout a clean room, and is normally installed in the clean room floor such that a top surface of the cover assembly 44 is flush with the top surface 32 of the clean room floor. The purpose of the central vacuum system is to provide ready access to a factory vacuum source for cleaning of processed tools or process machines.

The cover assembly 44 for the central vacuum outlet 40 is further shown in FIGS. 1B–1D. FIG. 1B is a perspective view of a cover assembly 44 positioned on top and spaced apart from the vacuum conduit 42. The cover assembly 44 is normally provided with a recess 34 in a top surface 36 of the cover assembly 44. The recess 34 is further provided with a pin 38 for grasp by a pair of pincers during a preventive maintenance procedure. The cover assembly 44 is constructed by an upper portion 46 and a lower portion 48 that are both formed in an annular shape. The outside diameter of the lower portion 48 is smaller than the inside diameter of the conduit 42 such that a snug fit can be achieved for a vacuum-tight seal. FIG. 1C illustrates a plane view of the cover assembly 44, while FIG. 1D illustrates a cross-sectional view of the cover assembly 44.

The cover assembly 44 illustrated in FIGS. 1A–1D serves the purpose of sealing a vacuum outlet 40. However, whenever an operator needs to use the vacuum by attaching a hose connector to the conduit 42, a pair of pincers or Allen wrench must be used to pick up the cover assembly 44 by the pin 38. This process must be repeated several times a day whenever the process chamber, or the process machine needs to be cleaned. To facilitate the removal of the cover assembly 44, other attempts have been made such as tying a cable tie to the pin 38 so that the cover assembly 44 can be picked up by pulling on the cable tie. However, the cable tie arrangement can produce particle contaminations for the clean room environment. It is therefore highly undesirable to introduce a foreign object for picking the cover assembly 44, i.e. either by a tool or by a cable tie that is tied to the cover assembly 44.

SUMMARY OF THE INVENTION

The present invention discloses a cover assembly that is equipped with a pivotable handle for a conduit opening which can be easily operated in a clean room floor of a semiconductor fabrication facility.

In a preferred embodiment, a cover assembly that is equipped with a pivotable handle for a conduit opening is provided which includes a cover body of generally annular shape that has an upper portion and a lower portion integrally formed together, the upper portion has an outside diameter not smaller than an outside diameter of the conduit opening, the lower portion has an outside diameter smaller than an inside diameter of the conduit opening for sealing the conduit opening when the lower portion of the cover body is inserted into the conduit opening such that a bottom surface of the upper portion sealingly engages an end surface of the conduit opening, the upper portion further includes a recess in a top surface for concealing the pivotable handle therein; and a pivotable handle of generally an elongated rectangular shape that has an elongated slot opening in a longitudinal direction therethrough and a finger grip at one end of the handle, the elongated slot opening slidingly engages a pin mounted in a horizontal position in the recess such that the pivotable handle rests horizontally in the recess when not used and stands vertically in the recess when pulled up by the finger grip by a sliding engagement between the elongated slot opening and the horizontally mounted pin.

In the cover assembly that is equipped with a pivotable handle for a conduit opening, an outside peripheral surface of the lower portion of the cover body frictionally engages an inside peripheral surface of the conduit opening to effect an air-tight seal. The outside diameter of the lower portion of the cover body is at least 1 mm smaller than the inside diameter of the conduit opening. The pivotable handle is formed generally in a T-shaped with the finger grip being a top of the T-shape. The cover assembly may be installed in a clean room floor and a top surface of the cover assembly may be flush with the clean room floor in an installed position. The elongated slot opening in the pivotable handle may have generally a rectangular shape. The conduit opening may be an opening for a vacuum port. The conduit opening may further be an opening for a conduit of a central vacuum system in a clean room.

In the cover assembly that is equipped with a pivotable handle for a conduit opening, the outside diameter of the upper portion of the cover assembly may be at least 50 mm. The upper portion and the lower portion of the cover assembly may have an annular shape. The lower portion of the cover assembly may further include a recess opening facing the conduit opening when the cover assembly is installed on the conduit opening. The upper portion and the lower portion of the cover assembly may further have an annular shape and a thickness of about 6 mm and about 13 mm, respectively.

The recess in the top surface of the upper portion of the cover assembly may be formed in a curved linear shape in a transverse direction of the cover assembly to allow a pivoting motion of the pivotable handle when the finger grip is pulled up by an operator. The recess in the top surface of the upper portion of the cover assembly may be formed to a width of about 8 mm and a length of about 40 mm. The upper portion and the lower portion of the cover assembly may be formed of a light weight material, such as aluminum. The pivotable handle may be formed of a high rigidity material, or a material that does not generate particle contamination.

It is therefore an object of the present emission to provide a cover assembly for a conduit opening that does not have the drawbacks or shortcomings of the conventional cover assemblies.

It is another object of the present invention to provide a cover assembly for a conduit opening in a central vacuum system used in a semiconductor fabrication facility.

It is a further object of the present invention to provide a cover assembly that is equipped with a pivotable handle for sealing a vacuum conduit opening.

It is another further objet of the present invention to provide a cover assembly that is equipped with a pivotable handle for sealing a vacuum conduit mounted in the floor of a semiconductor fabrication facility.

It is still another object of the present invention to provide a cover assembly that is equipped with a pivotable handle for a vacuum conduit opening wherein the pivotable handle is concealed in a recess provided in the cover assembly.

It is yet another object of the present invention to provide a cover assembly that is equipped with a pivotable handle for sealing a vacuum conduit opening that can be easily operated by a human hand.

It is still another further object of the present invention to provide a cover assembly that is equipped with a pivotable handle for sealing a vacuum conduit wherein a finger grip is provided on the pivotable handle.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
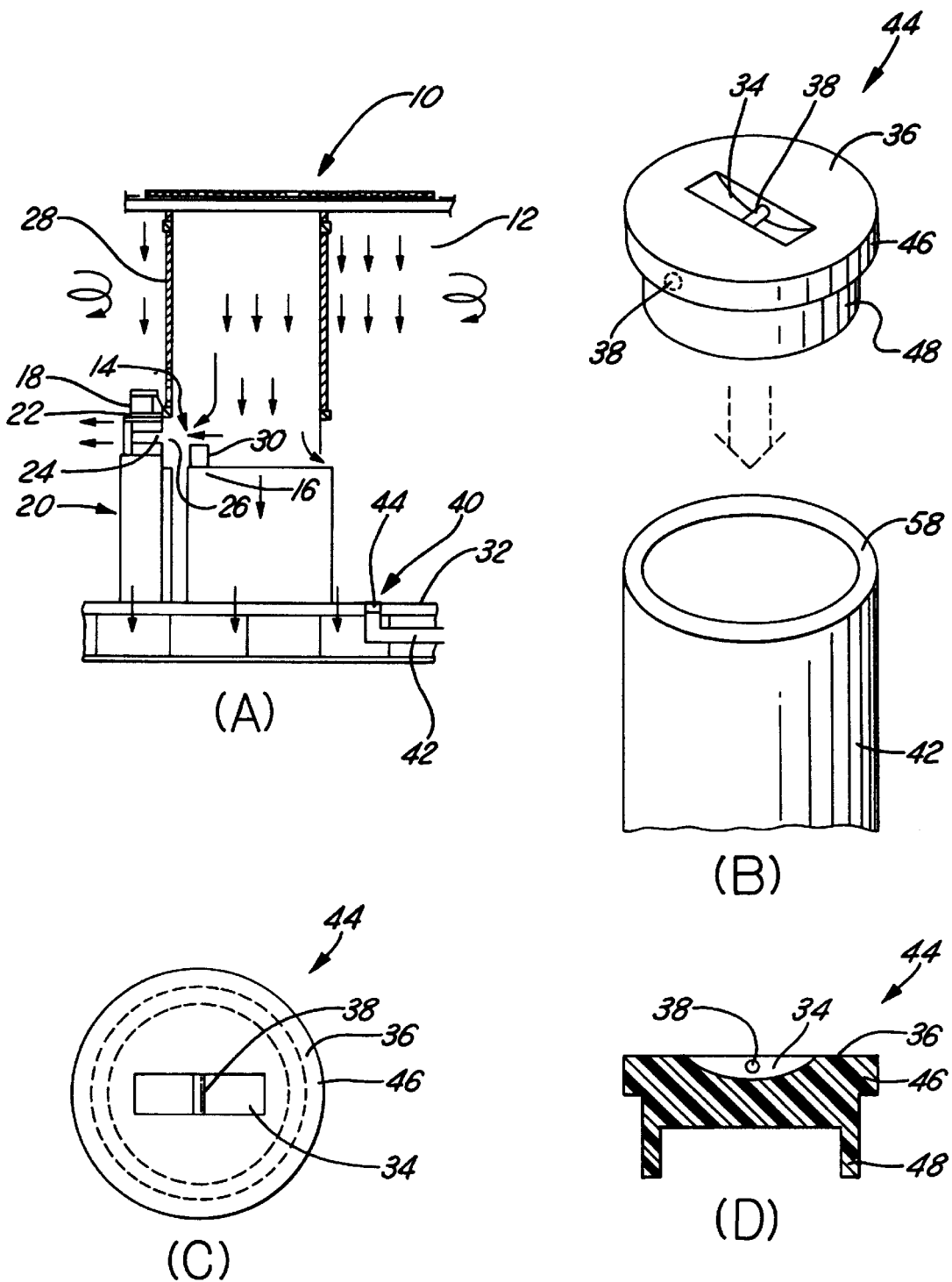
FIG. 1A is a schematic illustrating a conventional clean room set up with a SMIF, a mini-environment and a central vacuum outlet.
FIG. 1B is a perspective view of a conventional cover assembly positioned on top of a vacuum conduit.
FIG. 1C is a plane view of the cover assembly of FIG. 1B.
FIG. 1D is a cross-sectional view of the cover assembly of FIG. 1B.
Figure 2:
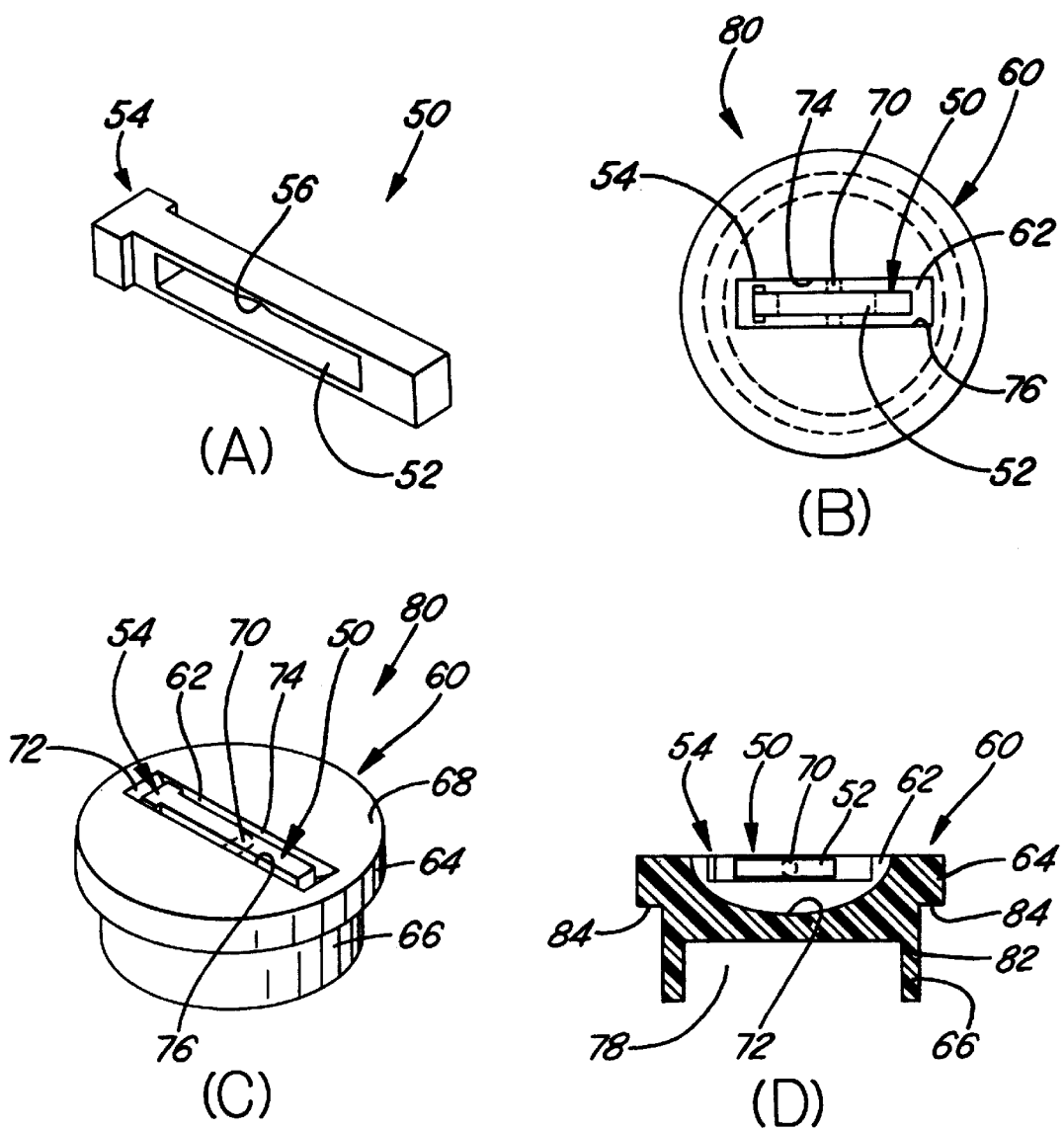
FIG. 2A is a perspective view of a pivotable handle used in a present invention cover assembly.
FIG. 2B is a plane view of the present invention cover assembly with the pivotable handle mounted therein.
FIG. 2C is a perspective view of the present invention cover assembly with the pivotable handle mounted therein.
FIG. 2D is a cross-sectional view of the present invention cover assembly with the pivotable handle mounted therein.

The present invention discloses a cover assembly for a conduit and more specifically, a cover assembly that is equipped with a pivotable handle for a vacuum conduit utilized in a clean room facility of a semiconductor fabrication plant.

The cover assembly of the present invention can be constructed by a cover body and a pivotable handle that rests in the cover body. The cover body can be formed generally of an annular shape consisting of an upper annular portion and a lower annular portion integrally formed or joined together. The upper annular portion has an outside diameter that is larger than an outside diameter of the conduit that the cover body is mated to. The annular lower portion has an outside diameter that is smaller than an inside diameter of the conduit opening, i.e. by at least 1 mm, for sealing the conduit opening when the lower portion of the cover body is inserted into the conduit opening such that a bottom surface of the upper annular portion sealingly engages the end surface of the conduit opening. The upper annular portion may further include a recess in a top surface for concealing the pivotable handle therein.

The second major part of the cover assembly of the present invention is a pivotable handle that is constructed generally of an elongated rectangular shape with an elongated slot opening in a longitudinal direction formed therethrough. The pivotable handle is equipped with a finger grip at one end of the handle. The elongated slot opening slidingly engages a pin that is mounted in a horizontal position in the recess such that the handle may pivot thereon. The pivotable handle rests horizontally in the recess when not in use and is thereby concealed in the cover body. The pivotable handle stands vertically in the recess when pulled up by the finger grip by a sliding engagement between the slot opening and the horizontally mounted pin.

Referring now to FIGS. 2A–2D wherein a present invention pivotable handle and a present invention cover assembly are shown.

A perspective view of a present invention pivotable handle 50 is shown in FIG. 2A. The pivotable handle is constructed of a material that has high rigidity and does not produce particle contamination after prolonged usage, i.e. particles do not flake off the handle. A suitable material for fabricating the pivotable handle may be aluminum or a rigid plastic such as nylon.

The pivotable handle 50 is constructed in a generally elongated rectangular shape, as shown in FIG. 2A, with an elongated slot opening 50 formed in the longitudinal direction of the handle therethrough. The pivotable handle 50 further includes a finger grip 54 formed at one end of the handle 50. The finger grip 54 is designed such that it can be easily pulled by the fingers of a human operator. The elongated slot opening 52 may further include an enlarged center portion 56 for ease of sliding engagement with the pin 70 (shown in FIG. 2C).

The pivotable handle 50 may be mounted in a cover body 60 by the pin 70 through the recess 62 in the cover body 60. This is shown in FIGS. 2B, 2C and 2D in a plane view, a perspective view and a cross-sectional view, respectively.

In FIG. 2B, a plane view of the present invention cover assembly 80 is shown which is constructed by a cover body 60 and a pivotable handle 50. As shown in FIG. 2C, the cover body 60 is constructed by two annular portions, i.e. an upper annular portion 64 and a lower annular portion 66 which are either integrally formed together, or joined together. In the upper annular portion 64, a recess 62 is provided in a top surface 68. The recess 62 is provided with a curve linear surface 72 (shown in FIG. 2D) formed perpendicularly with a top surface 68 of the upper annular portion 64. Two vertical side walls 74,76 are formed in the upper annular portion 64 by the curve linear surface 72. The recess 62 is formed of a size that is sufficient to accommodate the pivotable handle 50 to lie flat therein and to be concealed from the top surface 68 of the upper annular portion 64. The lower annular portion 66 may optionally contain a hollowed section 78, or a recess, to lighten the weight of the cover body 60.

It should be noted that, even though a vacuum conduit is not shown in FIGS. 2B–2D, when the cover assembly 80 engages a vacuum conduit, the outer peripheral surface 82 of the lower annular section 66 frictionally engages the inside peripheral surface of a vacuum conduit at its open end. When the frictional engagement is not desired, i.e. in order to avoid particle generation, a snug fitting may be provided. When the cover assembly 80 is mounted to a vacuum conduit opening, the bottom peripheral surface 80 of the upper annular portions 64 of the cover body 60 further engages the end surface (not shown) of the vacuum conduit opening. A similar end surface 58 for the conduit 42 is shown in FIG. 1B, which can be viewed as a reference.

A suitable size of the cover body 80 is about 60 mm in an outside diameter, and 45 mm in diameter in the hollow section 78. A suitable thickness for the upper annular portion is about 6 mm, while a suitable thickness for the lower annular portion is about 13 mm. The cover body may have a recess 62 that has a length of about 40 mm, and a width of about 8 mm.

Figure 3:
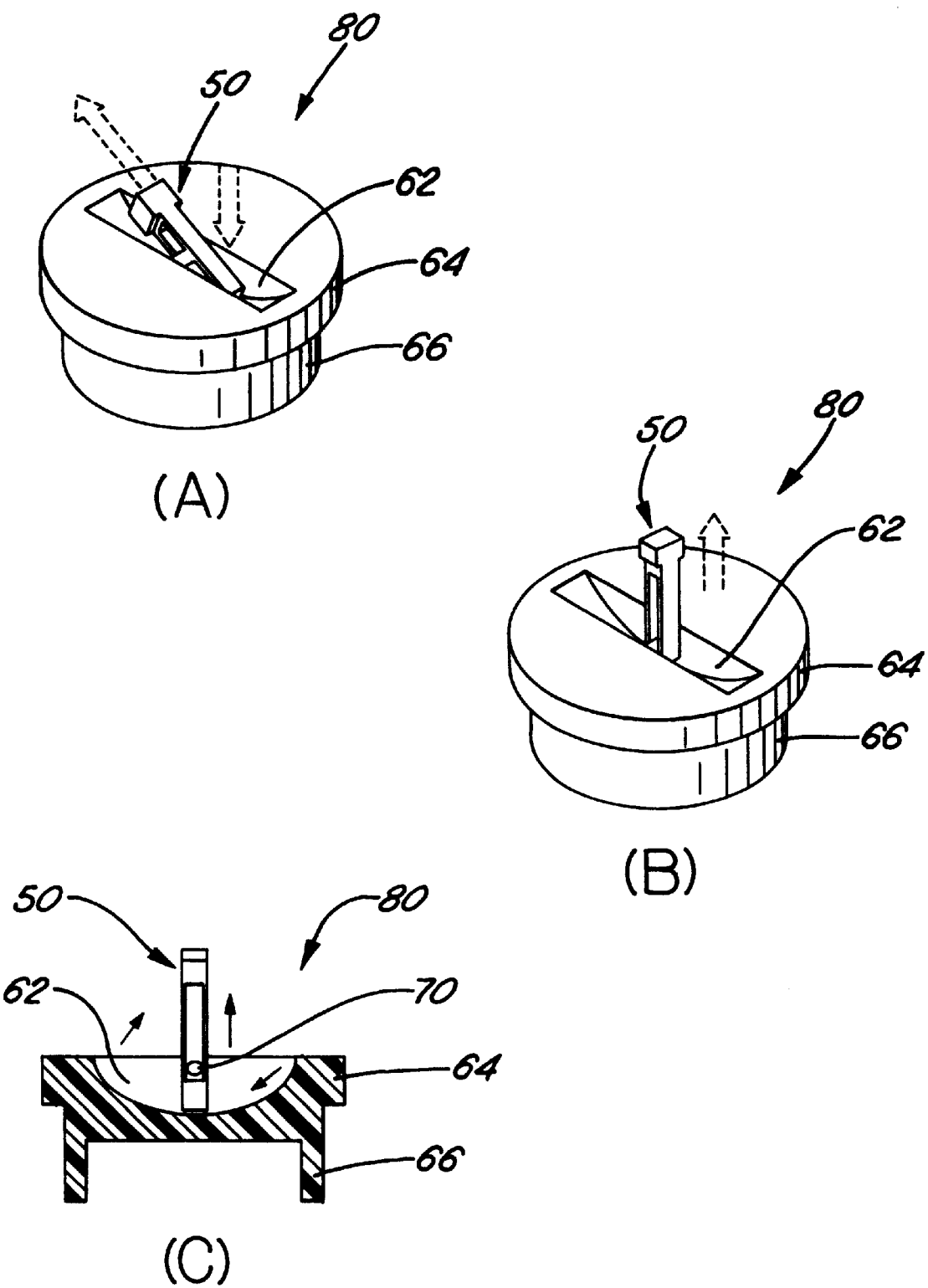
FIG. 3A is a perspective view of the present invention cover assembly with the pivotable handle partially lifted from the recess.
FIG. 3B is a perspective view of the present invention cover assembly with the pivotable handle fully lifted in an upward, vertical position.
FIG. 3C is a cross-sectional view of the present invention cover assembly with the pivotable handle in an upward, vertical position.

The operation of the present invention novel cover assembly 80 is shown in FIGS. 3A, 3B, and 3C in two perspective views and a cross-sectional view, respectively. For instance, FIG. 3A illustrates a perspective view of the present invention novel cover assembly 80 with the pivotable handle 50 in a partially pulled-out position (human fingers are not shown). A fully pulled-out position of the pivotable handle 50 is shown in FIG. 3B with the handle in an upward standing, vertical position. A similar upward standing, vertical position of the pivotable handle in shown in FIG. 3C in a cross-sectional view. A smooth sliding engagement between the elongated slot opening 52 and the pin 70 allows a smooth operation of the pivotable handle 50 such that it can either rest in a horizontal position when not in use, or be pulled up in a vertical position when in use.

The present invention novel cover assembly that is equipped with a pivotable handle for a vacuum conduit opening has therefore being amply described in the above description and in the appended drawings of FIGS. 2A–3C.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A cover assembly equipped with a pivotable handle for a conduit opening comprising:

a cover body of generally cylindrical shape having an upper portion and a lower portion integrally formed together, said upper portion having an outside diameter not smaller than an outside diameter of said conduit opening, said lower portion having an outside diameter smaller than an inside diameter of said conduit opening for sealing said conduit opening when said lower portion of the cover body is inserted into said conduit opening such that a bottom surface of said upper portion sealingly engages an end surface of said conduit opening, said upper portion further comprises a recess in a top surface for concealing said pivotable handle therein; and a pivotable handle of generally an elongated rectangular shape having an elongated slot opening formed in a longitudinal direction therethrough and a finger grip at one end of said handle, said elongated slot opening slidingly engages a pin mounted in a horizontal position in said recess such that said pivotable handle rests horizontally in said recess when not in use and stands vertically in said recess when pulled up by said finger grip by a sliding engagement between said elongated slot opening and said horizontally mounted pin.

2. A cover assembly equipped with a pivotable handle for a conduit opening according to claim 1, wherein an outside peripheral surface of said lower portion of the cover body frictionally engages an inside peripheral surface of said conduit opening to effect a vacuum-tight seal.

3. A cover assembly equipped with a pivotable handle for a conduit opening according to claim 1, wherein said outside diameter of said lower portion of the cover body is at least 1 mm smaller than said inside diameter of said conduit opening.

4. A cover assembly equipped with a pivotable handle for a conduit opening according to claim 1, wherein said pivotable handle being formed generally in a T-shape with said finger grip being a top of said T-shape.

5. A cover assembly equipped with a pivotable handle for a conduit opening according to claim 1, wherein said cover assembly is installed in a clean room floor and a top surface of the cover assembly is flush with said clean room floor in an installed position.

6. A cover assembly equipped with a pivotable handle for a conduit opening according to claim 1, wherein said elongated slot opening in said pivotable handle has generally a rectangular shape.

7. A cover assembly equipped with a pivotable handle for a conduit opening according to claim 1, wherein said conduit opening is an opening for a vacuum conduit.

8. A cover assembly equipped with a pivotable handle for a conduit opening according to claim 1, wherein said conduit opening is an opening for a conduit of a central vacuum system in a clean room.

9. A cover assembly equipped with a pivotable handle for a conduit opening according to claim 1, wherein said outside diameter of said upper portion of the cover assembly is at least 50 mm.

10. A cover assembly equipped with a pivotable handle for a conduit opening according to claim 1, wherein said upper portion and said lower portion of the cover assembly have an annular shape.

11. A cover assembly equipped with a pivotable handle for a conduit opening according to claim 1, wherein said lower portion of said cover assembly further comprises a recess opening facing said conduit opening when said cover assembly is installed on said conduit opening.

12. A cover assembly equipped with a pivotable handle for a conduit opening according to claim 1, wherein said upper portion and said lower portion of the cover assembly having an annular shape and a thickness of about 6 mm and about 13 mm, respectively.

13. A cover assembly equipped with a pivotable handle for a conduit opening according to claim 1, wherein said recess in said top surface of said upper portion of the cover assembly is formed in a curve linear shape in a transverse direction of the cover assembly to allow a pivoting motion of said pivotable handle when said finger grip is pulled by an operator.

14. A cover assembly equipped with a pivotable handle for a conduit opening according to claim 1, wherein said recess in said top surface of said upper portion of the cover assembly is formed to a width of about 8 mm and to a length of about 40 mm.

15. A cover assembly equipped with a pivotable handle for a conduit opening according to claim 1, wherein said upper portion and said lower portion of the cover assembly are formed of a lightweight metallic material.

16. A cover assembly equipped with a pivotable handle for a conduit opening according to claim 1, wherein said upper portion and said lower portion of the cover assembly are formed of aluminum.

17. A cover assembly equipped with a pivotable handle for a conduit opening according to claim 1, wherein said pivotable handle is formed of a high rigidity material.

18. A cover assembly equipped with a pivotable handle for a conduit opening according to claim 1, wherein said pivotable handle is formed of a material that does not produce particle contamination.

* * * * *